United States Patent [19]

Brown

[11] 3,841,311
[45] Oct. 15, 1974

[54] DENTAL PULP TESTER
[76] Inventor: Ronald W. Brown, 1034 Swingin Ln., Columbus, Ohio 43220
[22] Filed: Nov. 2, 1973
[21] Appl. No.: 412,352

Related U.S. Application Data
[63] Continuation-in-part of Ser. No. 235,391, March 15, 1972.

[52] U.S. Cl. .............................. 128/2.1 R, 128/2 R
[51] Int. Cl............................................ A61b 10/00
[58] Field of Search............. 128/2.1 R, 2 R, 303.1, 128/303.13, 172.1, 173 R, 36 L, 401, 403–406, 128/407, 410–411; 62/293; 219/229, 240–242

[56] References Cited
UNITED STATES PATENTS

| | | | |
|---|---|---|---|
| 3,274,995 | 9/1966 | Eidus | 128/2 R |
| 3,362,381 | 1/1968 | Farrell | 128/301.1 X |
| 3,507,283 | 4/1970 | Thomas, Jr. | 128/303.1 |
| 3,533,397 | 10/1970 | Scher | 128/399 X |
| 3,702,114 | 11/1972 | Zacarian | 128/303.1 |

Primary Examiner—Richard A. Gaudet
Assistant Examiner—Lee S. Cohen
Attorney, Agent, or Firm—Robert G. McMorrow

[57] ABSTRACT

A self-contained hand-held dental pulp tester which can selectively apply four different stimuli to a patient's tooth in order to test the tooth for dental pulp disease. The dental pulp tester includes manually selectable independent means without the need for replacement module tips for producing the different stimuli, and also includes a rechargeable pack of nickel cadmium batteries, a charge stand for continuously charging the batteries when the tester is not in use, a solenoid actuator to impart motion to the tip, with the tip being split into two tip portions, one portion containing the heating element, the cold nozzle and the electrical shock element and the other portion containing the impacting surface.

6 Claims, 8 Drawing Figures

PATENTED OCT 15 1974 3,841,311

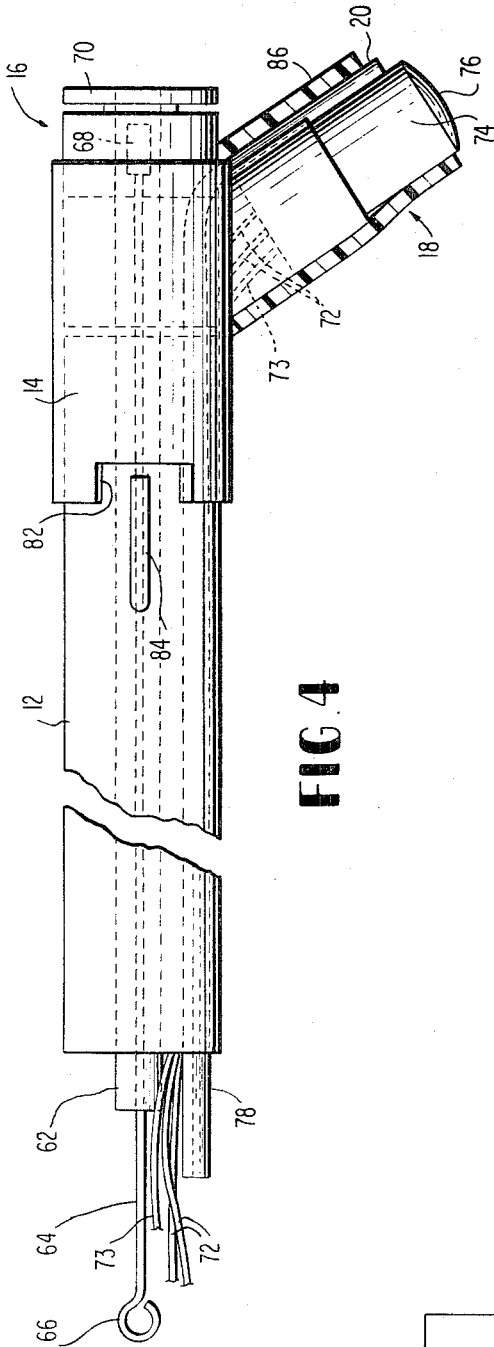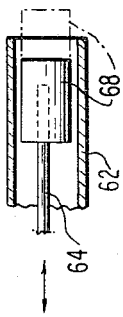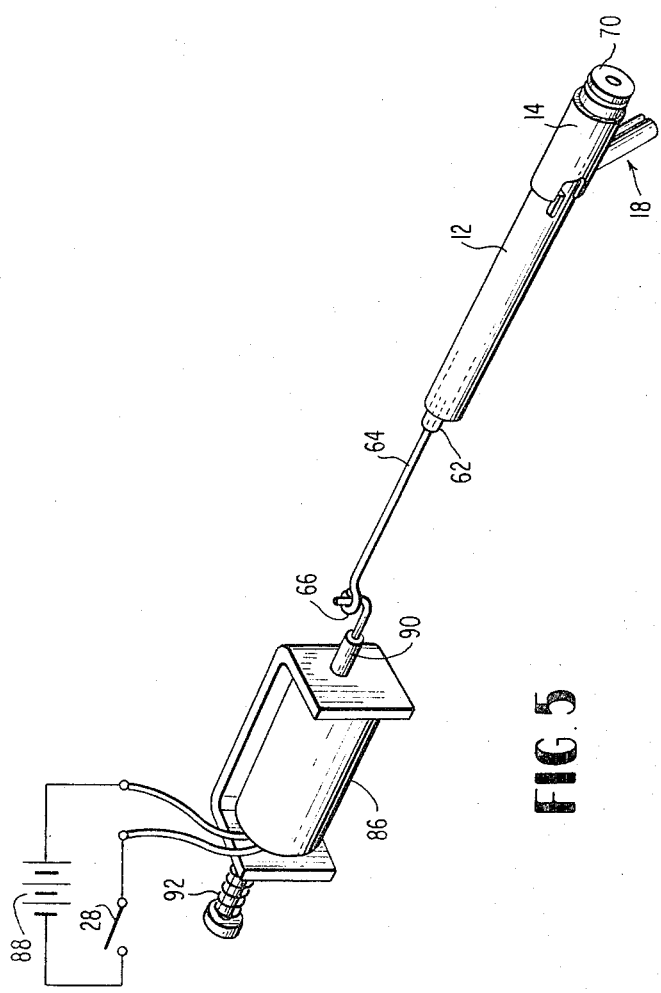

DENTAL PULP TESTER

CROSS-REFERENCE TO RELATED APPLICATION

This application is a continuation-in-part of copending application Ser. No. 235,391, filed Mar. 15, 1972, and the copending application is hereby expressly incorporated herein by reference.

BACKGROUND OF THE INVENTION

1. Field of the Invention:

The invention relates generally to the field of human tooth testing, and, more particularly, to a hand-held device for selectively applying a plurality of physical stimuli to a patient's tooth for the purpose of detecting dental pulp disease.

2. Description of the Prior Art:

The state of the prior art is reflected by U.S. Pat. No. 3,274,995, issued to Eidus and U.S. Pat. No. 3,533,397, issued to Scher.

The Eidus patent discloses a dental pulp tester having a tip or probe at each end thereof. Thermoelectric devices within the tester produce heat at one tip and cold at the other tip.

Scher does not relate to a dental pulp tester but rather to a general diagnostic instrument for imparting heat, cold and electric shock to the human body for testing the responsiveness thereof to these neurological stimuli. This instrument requires two different replaceable tip modules for providing the different stimuli to the patient's body.

SUMMARY OF THE INVENTION

The primary object of this invention is to provide a completely selfcontained hand-held dental pulp tester which can selectively apply four different stimuli to a patient's tooth in order to test the tooth for dental pulp disease.

A more specific object of the invention is to provide such a dental pulp tester with manually selectable independent means to provide at its tip heat, cold, electrical shock and mechanical impact stimuli to a patient's tooth.

Another object is to provide such a dental pulp tester which selectively produces all four stimuli at the tip of the tester without the need for replacement module tips for producing the different stimuli.

Still another object of the invention is to provide a dental pulp tester which is an improvement over that disclosed in said copending application.

Such improvements may be summarized as follows. The improved dental pulp tester contains a rechargeable pack of nickel cadmium batteries. A charge stand is provided for the tester so that the batteries may be continuously charged when the tester is not in use. A replaceable cold cartridge having its own integral valve is used. A solenoid actuator, rather than a mechanical actuator, is used to impart motion to the tip in order to provide a mechanical impact to a patient's tooth. The tip of the tester is split into two tip portions. One tip portion contains the impacting surface, while the other tip portion contains the cold nozzle, the heating element, and the electrical shock element. Furthermore, the tip is designed so that it can be rotated 90° in order to make the desired tip portion more accessible to the patient's tooth. An integral high voltage switch and rheostat replaces the two separate elements disclosed in the copending application. A high temperature resistive heater replaces the transistor of the copending application. Furthermore, the improved dental pulp tester is smaller and more compact than that disclosed in the copending application.

BRIEF DESCRIPTION OF THE DRAWINGS

FIG. 4 illustrates the details of the tester probe and tip.

FIG. 5 illustrates the details of the impact actuator.

FIG. 6 is a sectional view illustrating the details of the impactor tip portion.

DESCRIPTION OF THE PREFERRED EMBODIMENT

Figure 1:
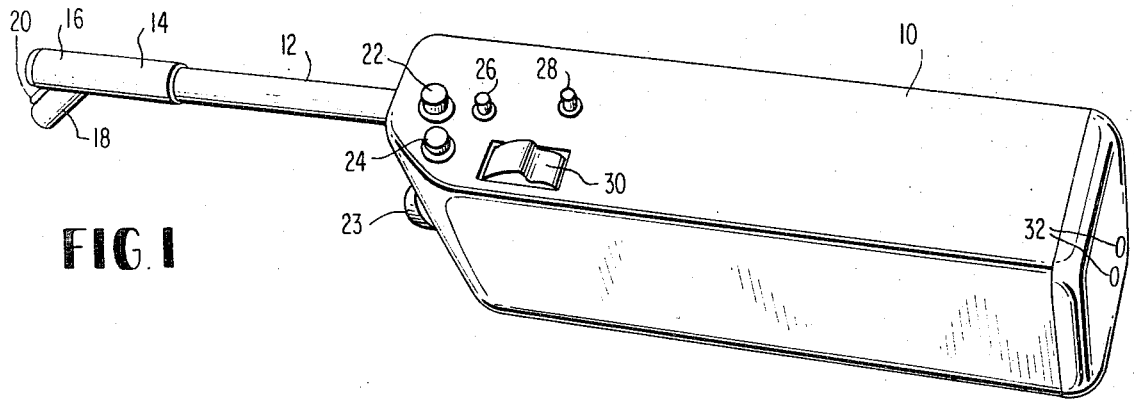
FIG. 1 is a perspective view of the complete improved dental pulp tester showing its exterior features.

FIG. 1 shows the exterior features of the improved dental pulp tester. The test comprises a housing 10 and extending therefrom a stainless steel tube 12 having mounted on the end thereof a probe 14 including tip portions 16 and 18. The probe is rotatable through an angle of 90° with respect to the tube 12. A nozzle 20 is fixed to the outside of the tip portion 18.

On the housing 10 are mounted a heat indicating lamp 22 and a high voltage indicating neon lamp 24. A push button 26 energizes the heater circuit, and a push button 28 energizes the impact actuator. A combined rheostat and switch 30 energizes the high voltage circuit.

Figure 3:
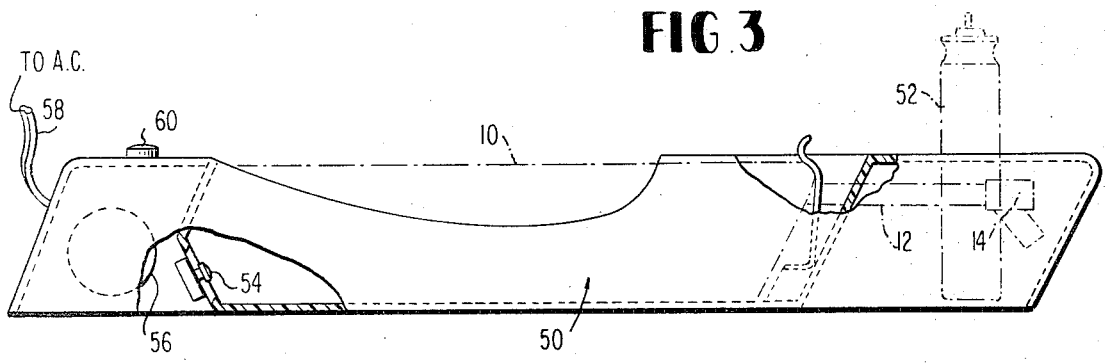
FIG. 3 illustrates a charging stand for the dental pulp tester.

A pair of electrical contacts 32 are used for charging the internal batteries when the tester is placed in the charging stand illustrated in FIG. 3.

Figure 2:
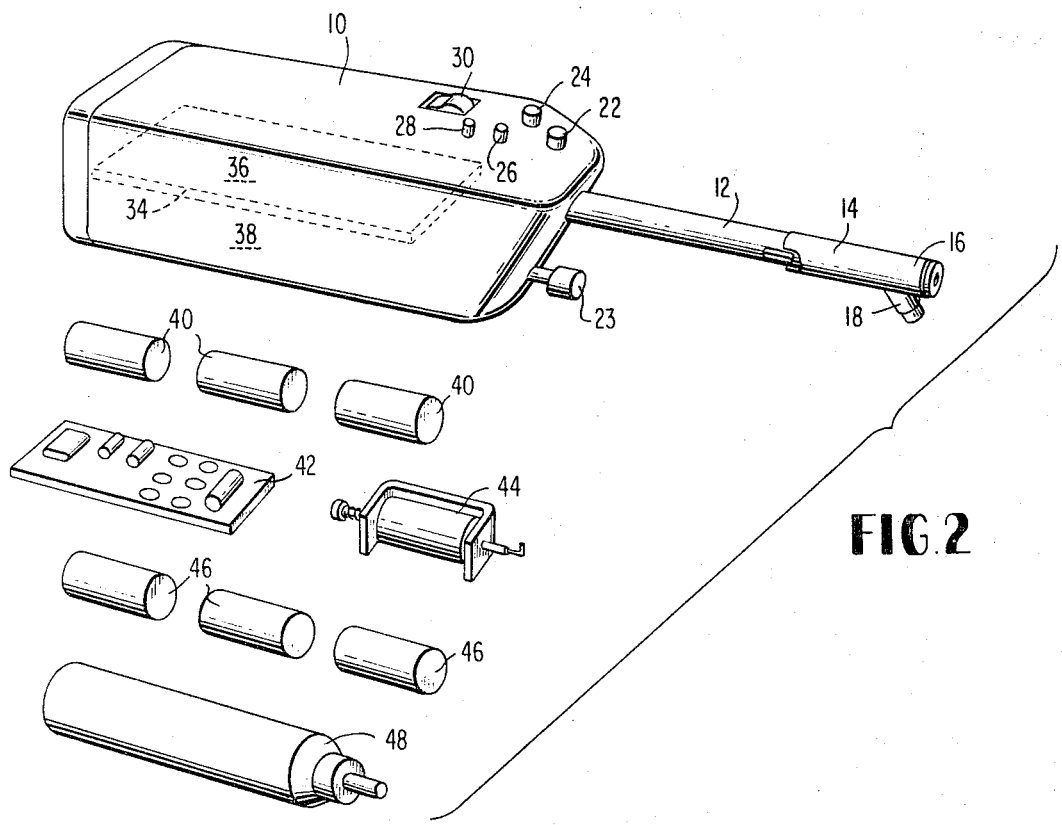
FIG. 2 illustrates the manner in which the various operating components are located within the housing of the dental pulp tester.

FIG. 2 illustrates the internal arrangement of the basic components in the housing 10. A partition 34 divides the housing into two compartments 36 and 38. Three nickel nickel cadmium batteries 40, the electronic circuits 42 and the solenoid actuator mechanism 44 are located above the partition in compartment 36, whereas three nickel cadmium batteries 46 and a freon container 48 are located below the partition 34 in the compartment 38. The batteries and the freon container may be removed and replaced by opening the back of the housing 10.

FIG. 3 illustrates a charging stand 50 for retaining the pulp tester when it is not in use and at the same time charging its internal batteries. In the figure, the pulp tester is shown in the rest position. The stand also contains a slot for holding a spare freon container 52. Mounted at the back of the stand 50 are a pair of spring loaded contacts 54 which engage the contacts on the back of housing 10 when the tester is in the position shown in the stand. Contacts 54 are connected through a conventional stepdown transformer and rectifying diodes 56 and a power cord 58 to a suitable source of A.C. house current such as 120 V. 60 cycles. A lamp 60 is energized when the contacts on the housing and in the stand are in engagement.

FIG. 4 illustrates the structure of the probe portion of the tester. Mounted within the outer tube 12 is a smaller tube 62 through which passes an impact rod 64. The left hand end of the impact rod 64 contains a loop 66 which is engaged by the solenoid actuator described below. The other end of the impact rod terminates in a nylon tip 68 which engages a tooth contact surface 70 when the impact rod is moved to the right.

Heater wires 72 extend through the rod 12 and into the tip portion 18 to energize the heater element 74 which also has a tooth contact surface 76. A freon capillary tube or conduit 78 also extends through the tube 12 and connects with the nozzle or orifice 20 mounted along the outer surface of the tip portion 18. The tip 14 is rotatably mounted on the tube 12 so that the tip portion 18 may be rotated through a 90° angle in order to improve accessibility to specific locations in the patient's mouth. Tip 14 contains a slot 82 which cooperates with a stop 84 fixed to the tube 12 in order to limit the rotation of the tip 14 to a 90° angle. The tip portion 18 carries an outer plastic cover 86 for protecting the patient's mouth from damage.

FIG. 5 illustrates the details of the solenoid actuator. The solenoid coil 86 is electrically connected via the push button 28 to the battery pack 88. Upon energization of the solenoid coil, the solenoid plunger rod 90 is quickly moved out of the coil to the right thereby forcing the rod 64 to the right and causing the nylon tip 68 to pass through the tooth contact surface and deliver a mechanical impact to the patient's tooth. When the push button is released, the solenoid is de-energized, and a spring 92 withdraws the plunger rod 90 back into the solenoid, thereby also withdrawing the rod 64 and nylon tip 68. The total movement of the rod and the nylon tip is approximately 3/16 of an inch.

FIG. 6 illustrates in more detail the position and relative movement of the nylon tip 68.

Figure 7:
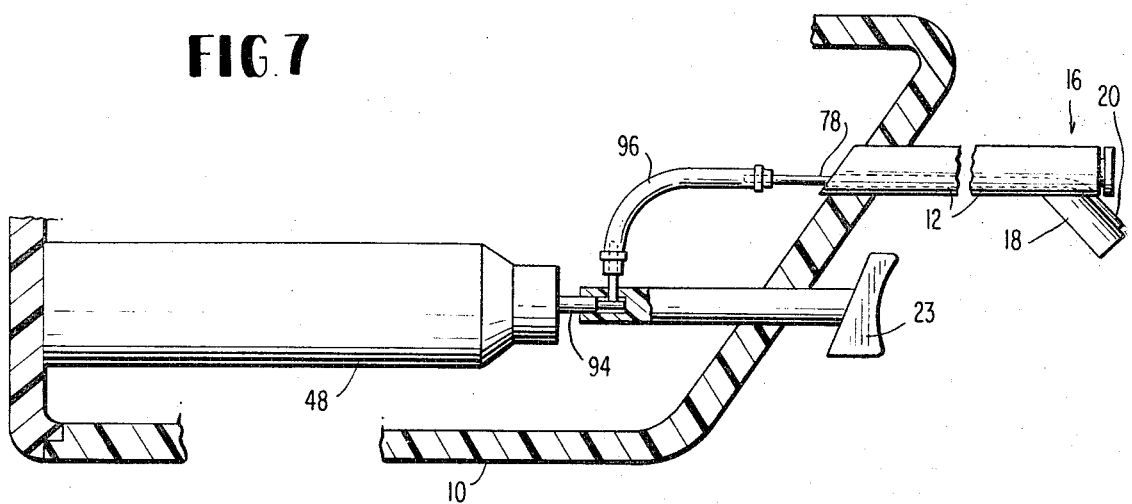
FIG. 7 illustrates the details of the cooling arrangement for the improved pulp tester.

FIG. 7 illustrates the cooling arrangement of the tester. The container 48 of liquid freon is mounted within the housing 10 and contains its own integral valve 94 which is a typical aerosol canister type valve. The valve 94 is mechanically connected to the cold actuator push button 23 such that when the push button is depressed, the valve is open to permit the liquid freon under pressure to escape through a flexible plastic tubing 96 and the capillary tube 78 and thence to the nozzle or orifice 20 where the liquid quickly expands to form a gas which provides the cooling action to the patient's tooth.

Figure 8:
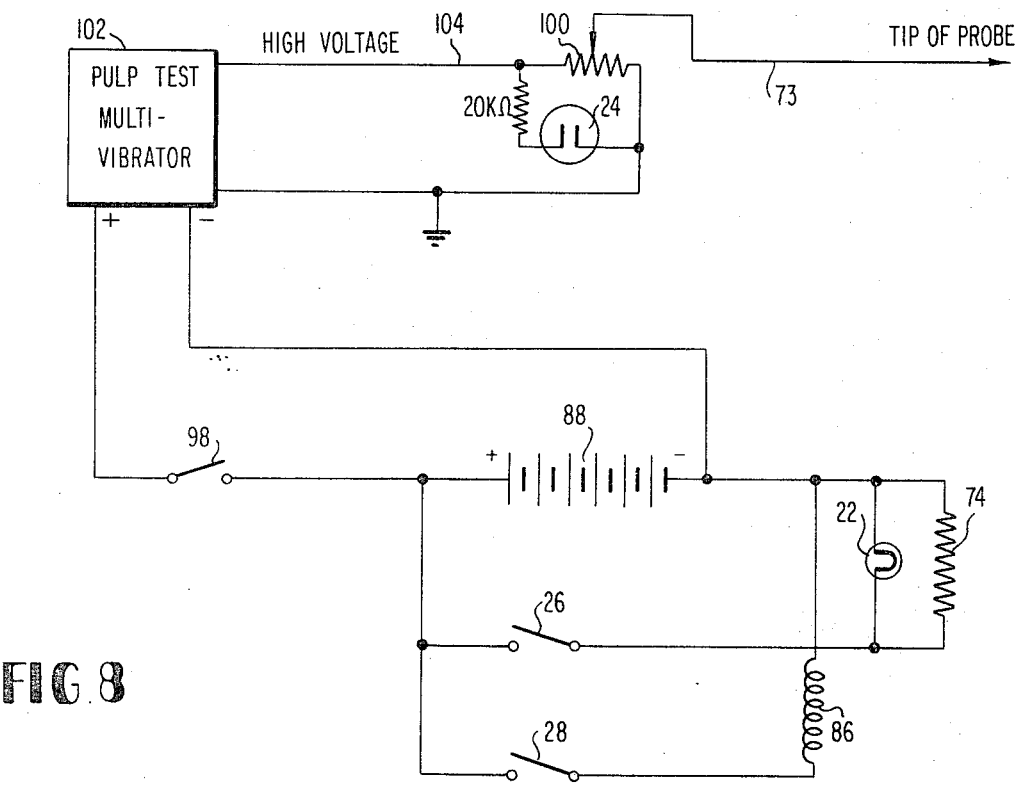
FIG. 8 is a schematic diagram of the power circuit for energizing the high voltage function, the heater, and the impact actuator.

FIG. 8 is a schematic diagram illustrating the electrical circuit for operating the various functions of the tester. Resistive heater 74 and the impact solenoid 86 are connected parallel across the battery pack 88, each through its corresponding push button 26 and 28, respectively. The heat lamp 22 is connected across the heater and provides an indication when the push button 26 is closed for energization of the heater.

The high voltage is provided to the tooth contact surface 76 of the heater element 74 and the tip portion 18 by means of a high voltage generating circuit connected across the battery pack through a switch 98 which is structurally integrated with the potentiometer 100. When switch 98 is closed, the battery energizes a multivibrator 102 which produces on its output line 104 a high voltage which is coupled through the potentiometer 100 via wire 73 to the tip surface 76. The potentiometer may be adjusted to control the level of the high voltage. The neon lamp 24 is connected across the potentiometer in order to provide an indication that high voltage is being applied to the tip of the probe. The high voltage circuit is grounded to the housing 10 of the pulp tester.

While the invention has been particularly shown and described with reference to the preferred embodiment thereof, it will be understood by those skilled in the art that various changes in form and details may be made therein without departing from the spirit and scope of the invention.

I claim:

1. A hand-held dental pulp tester comprising:
   a. a housing;
   b. a rigid hollow tube mounted in said housing and extending therefrom and terminating in first and second tip portions angularly displaced from each other;
   c. a nozzle mounted in said first tip portion;
   d. a pressurized container of vaporizable coolant mounted in said housing;
   e. a conduit coupled between said container and said nozzle;
   f. a normally closed pressure release valve means coupled between said conduit and said container;
   g. cold actuator means mounted on said housing for opening said valve means to permit cold coolant vapor to be discharged through said conduit to said nozzle mounted on said first tip portion;
   h. electric heating means mounted in said first tip portion;
   i. means for mounting a battery in said housing;
   j. terminal means in said housing for making electrical contact with a battery mounted in said housing;
   k. normally open switch means connected between said terminal means and said electric heating means;
   l. heat actuator means mounted on said housing for closing said switch means to energize said heating means and heat the outer surface of said first tip portion;
   m. high voltage generating means connected between said terminals and said first tip portion;
   h. a normally open high voltage switch connected between said terminal and said high voltage generating means;
   o. a high voltage actuator mounted on said housing for closing said high voltage switch to apply high voltage to said first tip portion; and
   p. means for imparting a mechanical shock to a patient's tooth through said second tip portion.

2. A hand-held dental pulp tester as defined in claim 1 wherein said imparting means comprises:
   a. a solenoid actuator mounted in said housing and energizable by said battery,
   b. an impact rod mechanically connected to said solenoid actuator and extending through said hollow tube and said second tip portion, so that sudden motion is imparted to said rod when said solenoid is energized, thereby imparting mechanical shock to a patient's tooth engaged by the end of said rod, and c. solenoid actuator means mounted on said housing for energizing said solenoid actuator.

3. A hand-held dental pulp tester as defined in claim 2 further comprising means for rotating said first tip portion through an angle 90° about the axis of said second tip portion.

4. A hand-held dental pulp tester as defined in claim 3 wherein said heating means comprises a resistive heater.

5. A hand-held dental pulp tester as defined in claim 3 wherein said battery is rechargeable and further comprising a pair of charging contacts mounted on the outside of said housing and connected in a charging circuit for said battery.

6. A hand-held dental pulp tester as defined in claim 5 further comprising a charging stand storing said tester, said stand comprising a pair of power contacts engaging said charging contacts when said tester is stored in said stand, and means for connecting said power contacts to a source of electrical power for charging said battery.

* * * * *